(No Model.)
W. H. STEWART.
WEIGHING SCALES.
No. 407,747. Patented July 23, 1889.
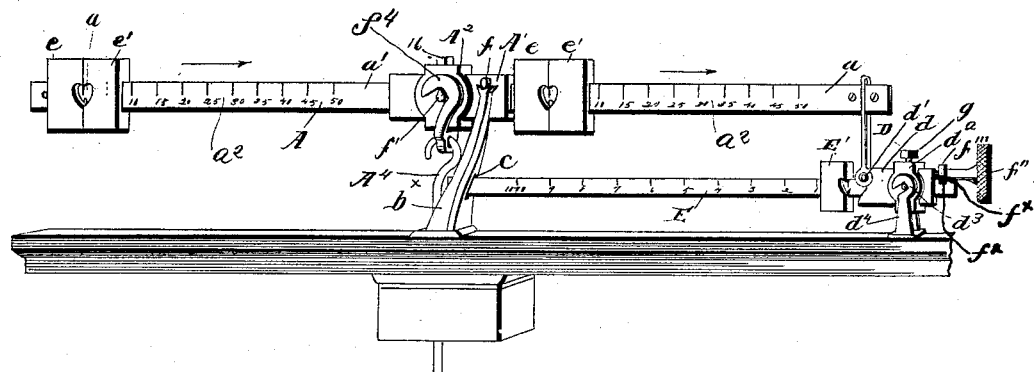
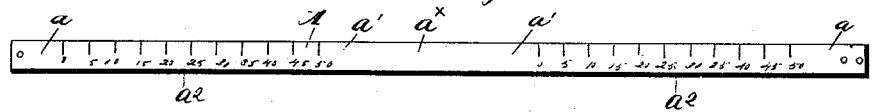
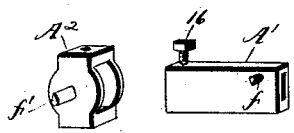 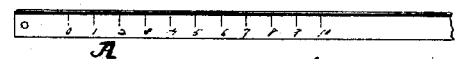
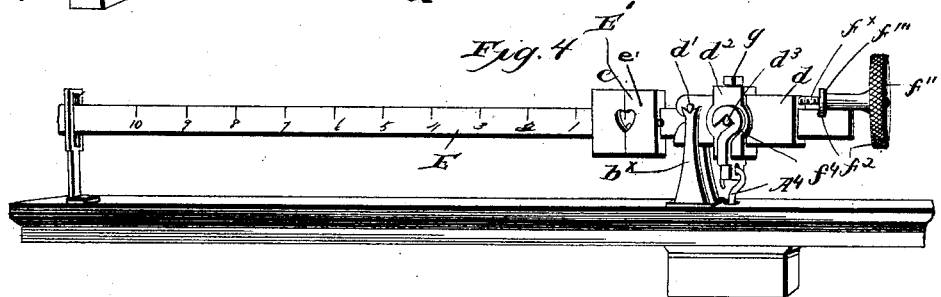
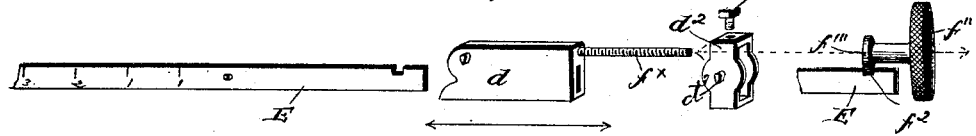
WITNESSES
Walter H. Pumphrey.
H. C. Johnson.
INVENTOR
Wm. H. Stewart.
By J. C. Higdon
his Attorney

UNITED STATES PATENT OFFICE.

WILLIAM H. STEWART, OF KANSAS CITY, KANSAS, ASSIGNOR OF ONE-HALF TO WILLIAM S. WHITTAKER, OF SAME PLACE.

WEIGHING-SCALES.

SPECIFICATION forming part of Letters Patent No. 407,747, dated July 23, 1889.

Application filed November 15, 1888. Serial No. 290,971. (No model.)

*To all whom it may concern:*

Be it known that I, WILLIAM H. STEWART, a citizen of the United States, residing in Kansas City, county of Wyandotte, and State of Kansas, have invented a series of useful Improvements in Weighing-Scales, of which the following is a clear and exact description, reference being had to the accompanying drawings, forming part of this specification.

This invention relates to certain improvements in weighing-scales, having for its object to provide for balancing the beam without the use of counterpoises, to remedy slight variations that may exist between sets of weighing-poises, and to increase or augment the weighing capacity of the scale; and to these ends the invention consists in a novel construction and combination of devices, fully described hereinafter in connection with the drawings, and specifically pointed out in the claims.

In the drawings, Figure 1 is a side view of a scale embodying my invention. Fig. 2 is a side view of the beam detached. Fig. 3 is a detail view of the beam, (partly broken away,) the fulcrum-sleeve and the slide detached. Fig. 4 is a detail perspective view of the auxiliary beam with its equipments arranged to enable it to be used independently of the main scale-beam, and Fig. 5 is a similar view of the auxiliary beam with its members detached.

In the construction of my improved scales I employ a main scale-beam A, having its fulcrum at an intermediate point and provided with arms $a^2$ $a^2$, which are inscribed with independent scales or series of graduations. These scales read, respectively, from the outer end of one arm inward (toward the fulcrum) and from the inner end of the other arm outward, (from the fulcrum.) Central open or blank spaces $a'$ $a'$ are arranged between the central point $a^x$ of the scale-beam and the adjacent ends of the scales, and similar blank spaces $a$ $a$ are arranged at the outer ends of the arms of the scale-beam. Thus one of the scales reads from a space $a$ inward toward the space $a'$ on the same side of the fulcrum, and the other scale reads from the space $a'$ on the opposite side of the fulcrum outward toward the space $a$.

Upon the beam A are arranged two sets of poises disposed, respectively, on opposite sides of the fulcrum and consisting each of two poises $e$ $e'$. One set of poises is applied to each scale and they normally occupy the spaces $a$ $a'$ at the initial ends of said scales, being wholly disposed in said spaces. Thus one set is arranged in the space at or near one end of the beam, while the other set is arranged in the space at or near the other side of the fulcrum, or one each may be shifted to each end space and to each space upon the opposite side of the fulcrum.

The scale-beam A passes at its center through a fulcrum-sleeve A', (which is provided with a longitudinal bore to receive it,) said sleeve being provided on its opposite sides with lateral pivots or fulcrums $f$, which rest upon the fulcrum support or post $b^x$, secured upon a suitable bracket or support, as shown.

The sleeve is provided with a binding or set screw 16, which passes through a threaded aperture and impinges against the scale-beam to hold it stationary in the sleeve, and a slide $A^2$, which fits on the sleeve, is also engaged and held in position by the said set-screw. This slide is provided with an opening which is equal in size to the exterior of the sleeve and fits snugly thereon, and it is also provided with lateral scale-platform pivots $f'$, through which and the usual hooks $f^4$ connection is effected between the scale-beam and the rod $A^4$ of the scale-platform. (Not shown.)

The auxiliary scale-beam E, which is preferably arranged beneath that arm of the main beam having the outwardly-reading scale, is provided with a loose fulcrum-sleeve $d$, having lateral pivots $d'$, carrying a link D, which is looped or otherwise connected to the extremity of said arm of the scale-beam A, which extends thereover. A slide $d^2$ fits on the sleeve $d$, and is provided with lateral pivots $d^3$, which rest in a bearing in the fulcrum-support $d^4$, as shown clearly in Fig. 1. The slide $d^2$ is provided with a set-screw $g$, whereby it is clamped securely on the sleeve $d$.

It will be seen that the long arm of the auxiliary beam is in effect suspended from one end of the main beam, whereby a weight or poise placed on the arm of the auxiliary beam (which is graduated, as shown, from the link outward) has a double or increased leverage on the main scale-beam. The scale on the auxiliary beam reads from the link D outward, and a poise E' is provided to register with the graduations. This poise E' may be single, as shown in Fig. 1, or it may consist of two members $e$ $e'$, as shown in Fig. 4. The poise shown in Fig. 4 is similar to the poises shown in connection with the main scale-beam in Fig. 1.

The auxiliary scale-beam E is capable of longitudinal movement or adjustment by means of a milled screw sleeve or nut $f''$ engaging a screw $f^x$, which projects rearwardly from the sleeve $d$, said nut bearing through a disk $f''''$ formed thereon in a notch $f^2$ in the beam E. The poise on the beam E also normally occupies a blank or ungraduated space at one end of the beam.

From the foregoing it will be seen that in order to balance the main scale-beam A the poises $e$ $e'$ are all adjusted at their respective zeros, as shown in Fig. 1, and the beam A, after loosening the screw 16, is slid or moved longitudinally in the sleeve A' until balanced. The weighing operation may now be conducted by moving the auxiliary weight-poise $e'$, standing at the left on one end of the beam A, inward, or by moving the auxiliary poise $e'$, standing at the right of the fulcrum, outwardly, the direction of movement being indicated by the arrows.

The movable slide $A^2$, carrying the weighing-pivots, provides for the preliminary balancing of the weighing-poises, which is a matter the manufacturer has wholly to do with. The manufacturer finds it necessary to equalize slight differences or discrepancies in the weight of two or more sets of poises in order to produce an accurate scale. To do this the weighing-pivots are moved slightly to or from the fulcrum, as may be required, the poises then having a portion of their weight or bulk removed or their bulk increased until each balances the other, the weighing-pivots now being fixed at their normal positions. When loose weights are used, they are suspended or fixed proportionately distant from the fulcrum-points established and governed by the standard.

In Fig. 4 is shown the auxiliary scale-beam E as applied for use separate from the main scale-beam A. This adjustment is accomplished by disengaging the link D from the pivots $d'$, resting the pivots $d'$ on the fulcrum-supports $b^x$, (in the same way that the main beam is fulcrumed in Fig. 1,) and engaging the hooks $f^4$ of the scale-platform with the pivots $d^3$. It will be seen that this change consists merely in substituting the hooks $f^4$ for the standard $d^4$. (Shown in Fig. 1.)

From the above it will be evident that while the main scale-beam may be employed independently of the auxiliary beam it is preferable to combine them, inasmuch as the weighing capacity of the scale is thereby increased; but when small or light articles are to be weighed the scale-platform is preferably suspended from the fulcrum-pivots of the auxiliary beam and the weighing done on the latter.

It will be seen that the scale-platform or "load" is suspended from that arm of the main scale-beam on which the graduations increase toward the fulcrum or inward, and the auxiliary scale-beam is connected to the extremity of that arm of the main beam on which the graduations increase from the fulcrum or outward, as shown. The load in the improved scale is always suspended from the main beam, the auxiliary beam being merely employed to carry supplementary poises, whereby the leverage on the main beam is increased in order to increase the weighing capacity of the scale.

Having thus fully described my invention, what I claim as new, and desire to secure by Letters Patent, is—

1. A scale-beam fulcrumed at an intermediate point and provided on each side of its fulcrum with a series of graduations which increase, respectively, toward and from the fulcrum, and also provided at each end of each series with a space devoid of graduations to receive the poises, in combination with two sets of poises arranged, respectively, on opposite sides of the fulcrum and adapted to occupy said ungraduated spaces, each set of poises consisting of two independent members, substantially as and for the purpose specified.

2. A longitudinally-adjustable scale-beam fulcrumed at an intermediate point, provided on each side of its fulcrum with a series of graduations which increase in the same direction, respectively, toward and from the fulcrum, and also provided with a central space and end spaces which are devoid of graduations, substantially as specified.

3. In weighing-scales, the centrally-poised main beam, both arms of which are graduated and carry weighing-poises, in combination with an auxiliary beam, the longer arm of which is connected near the fulcrum to the outer or free end of one of the arms of the main beam, substantially as specified.

4. In weighing-scales, the centrally-poised main beam, each arm of which is provided with a series of graduations which increase, respectively, toward and from the fulcrum, the load being suspended from the inner end of that arm on which the graduations increase toward the fulcrum, and the weighing-poises arranged, respectively, on the arms of the beam and adapted to be normally located at the initial points of the series of graduations, in combination with an auxiliary scale-beam carrying a poise on its longer graduated arm, said arm being connected near its fulcrum to the extremity of that arm of the main beam on which the graduations increase outward or from the fulcrum, substantially as specified.

5. In weighing-scales, the combination of the main centrally-poised beam having a movable pivot, and having both arms graduated, respectively, toward and from the said pivot, the movable weighing-poises arranged, respectively, on opposite sides of the pivot, and the auxiliary beam provided with a movable pivot and a weighing-poise, and having its longer arm connected to the extremity of one of the arms of the main beam, substantially as specified.

6. A scale-beam provided with a blank or ungraduated space and an auxiliary weighing-poise, in combination with the usual weighing-poise upon the same beam and adapted to register with the same series of graduations and the longitudinally-adjustable auxiliary beam, substantially as set forth.

7. In a weighing-scale, the combination of the scale-beam having two series of graduations and having a blank or ungraduated space at each end of each series of graduations, and the two sets of poises of two poises to each set, one set being adapted to register with each series of graduations, substantially as specified.

8. In weighing-scales, the combination of a centrally-poised main scale-beam having both arms graduated, the two sets of double poises arranged, respectively, on the two arms of the scale-beam, and a movable sleeve fitting on said beam between the series of graduations and carrying the pivots for the scale-beam and the scale-platform rod, substantially as specified.

9. In weighing-scales, the combination, with a separate sleeve provided with pivots and a scale-beam extending through and supported in said sleeve, of the movable slide carrying weighing-pivots adjusted on the said sleeve, substantially as and for the purpose specified.

10. In weighing-scales, the combination, with a double or centrally-fulcrumed main scale-beam carrying weighing-poises and provided with a movable sleeve having the poising and weighing pivots, of the auxiliary scale-beam fitting in a fulcrumed sleeve which is connected to one arm of the main scale-beam, said auxiliary beam being longitudinally adjustable in the said sleeve, substantially as specified.

11. In weighing-scales, the combination, with the main centrally-poised scale-beam, of an auxiliary scale-beam provided with a fulcrumed sleeve which is connected to the main scale-beam and is provided with a threaded stem and a milled nut fitting on said stem and provided with a flange which engages a notch in said auxiliary beam, whereby the latter may be longitudinally adjusted in the sleeve by turning the nut on the stem, substantially as and for the purpose specified.

12. In weighing-scales, the combination, with a scale-beam, of a loose sleeve fitting on the beam and provided with pivots and a slide fitting on the said sleeve and provided with pivots, substantially as specified.

WILLIAM H. STEWART.

Witnesses:
S. M. GARATT,
C. S. ELLIOTT.